Dec. 10, 1940. P. R. HOLTZMAN ET AL 2,224,634
APPARATUS FOR BAKING ARTICLES OF DOUGH
Filed July 31, 1936  2 Sheets-Sheet 1
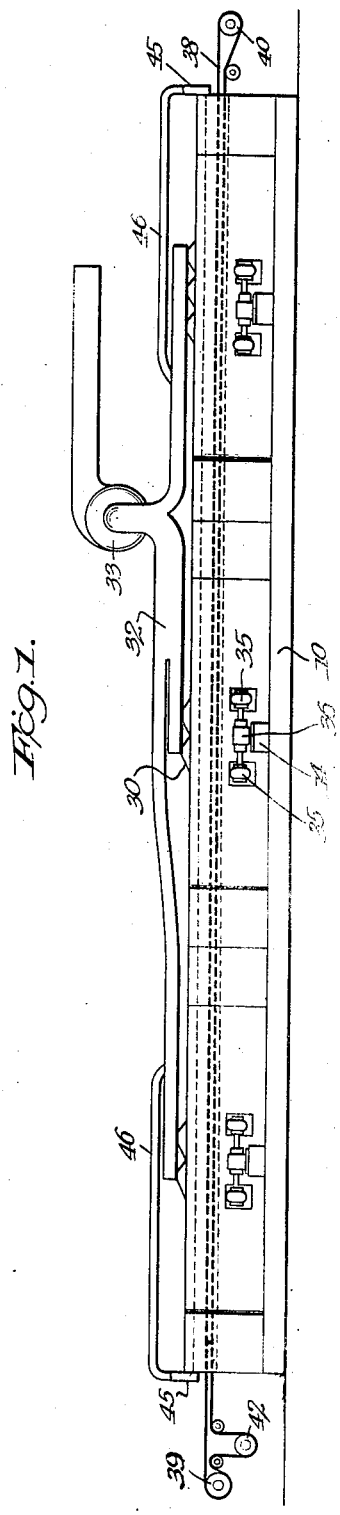
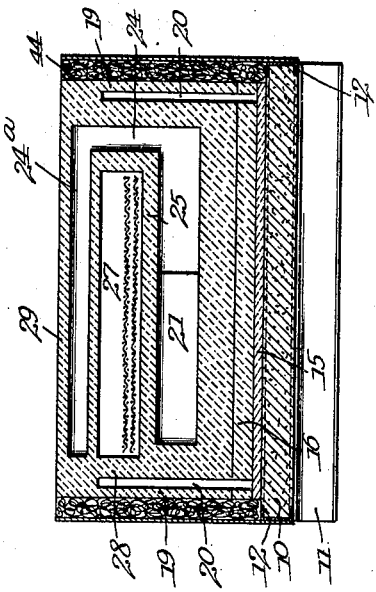
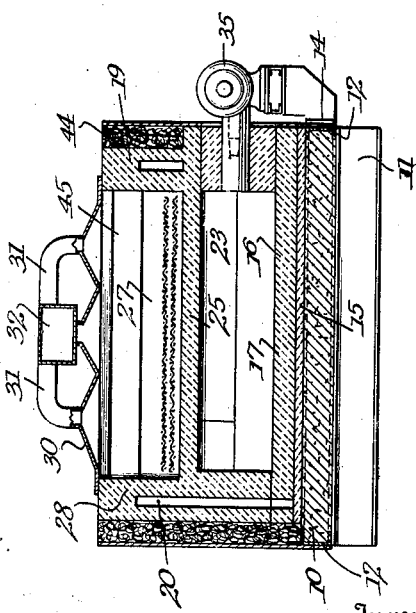
Inventors
Paul R. Holtzman
Allen B. Holtzman
By their Attorneys Dec. 10, 1940.  P. R. HOLTZMAN ET AL  2,224,634
APPARATUS FOR BAKING ARTICLES OF DOUGH
Filed July 31, 1936  2 Sheets-Sheet 2
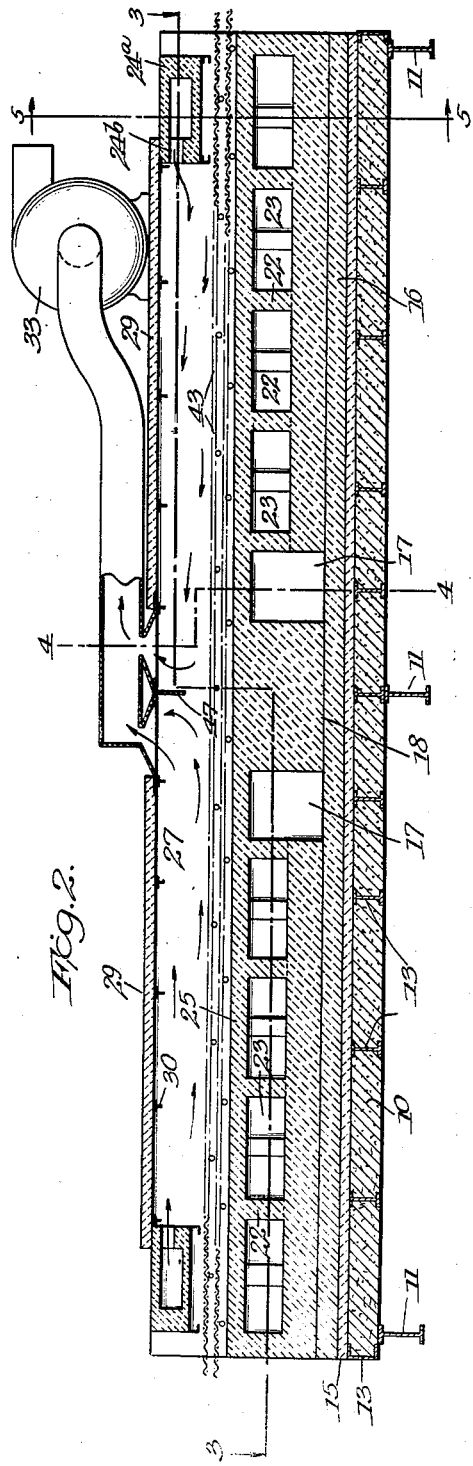
Inventors
Paul R. Holtzman
Allen B. Holtzman Patented Dec. 10, 1940

2,224,634

UNITED STATES PATENT OFFICE 2,224,634

APPARATUS FOR BAKING ARTICLES OF DOUGH

Paul R. Holtzman and Allen B. Holtzman, Myerstown, Pa., assignors to Holtzman's Inc., Myerstown, Pa., a corporation of Pennsylvania Application July 31, 1936, Serial No. 93,683

16 Claims. (Cl. 107—57)

The present invention relates to baking ovens and more particularly to continuous or travelling ovens, and aims to improve the construction and efficiency of the oven.

In order that the invention may be fully understood by those skilled in the art, reference is made to the accompanying drawings illustrating a section or unit of an oven constructed in accordance with the invention.

In the drawings—

Fig. 1 is a side elevation of the improved oven;

Fig. 2 is a central longitudinal sectional view of one unit or section of the oven;

Fig. 3 is a horizontal sectional view, partly through the heating flues and partly through the baking chamber thereof taken on the line 3—3 of Fig. 1;

Fig. 4 is a transverse sectional view taken on the line 4—4 of Fig. 2; and

Fig. 5 is a transverse sectional view taken on the line 5—5 of Fig. 2.

One of the broader features of the invention includes the method of baking articles of dough which comprises continuously moving the dough material through a heated baking chamber while supported on a foraminous support, so as to subject the dough material to uniform top and bottom heat, producing uniformly baked articles. A further important feature of the invention resides in the method of baking dough articles in a uniformly, relatively dry baking atmosphere, substantially free from steam generated by the heated dough articles. Another feature of the invention resides in the method of baking dough articles on a foraminous support in a dry baking heat composed entirely of products of combustion. Other features of the invention reside in novel details of construction which are highly useful in practice.

The invention is particularly concerned with the improvement of the method of and apparatus for baking crackers, biscuits and the like, as distinguished from bread and the like.

The invention may be profitably practiced by means of an oven constructed of a plurality of units or sections, one of which is illustrated in the accompanying drawings. The size of these units will vary depending upon the width thereof, and the capacity of the heating means as well as the purpose for which the oven is to be used. We have found that where crackers, biscuits and the like are to be baked, requiring a temperature of approximately 400° to 500° F. the units advantageously may be approximately twenty to twenty-five feet in length and approximately six feet wide. The number of units will, of course, depend upon the time required for the satisfactory baking of any particular product, and to produce an oven of desired length to provide a sufficiently long baking period, a desired number of sections or units may be arranged end to end, so as to provide a relatively long oven composed of a plurality of units. Of course the total number of units required for a sufficiently long baking period will depend, in part, upon the speed at which the material traverses the oven.

The oven is advantageously constructed of brick material built upon a base 10 supported upon a suitable structure framework 11, which may include longitudinal and transverse I-beam supports carried by uprights of any approved design to sustain the weight of the oven structure. Assuming that the base 10 is substantially at the first floor level of a building, the framework 11 may be located in the basement resting on its own foundation or footings.

The base 10 is advantageously composed of a structural steel framework composed of structural steel, longitudinal and transverse members 12 and 13 respectively, as for example steel channels or beams loosely connected to and resting upon corresponding longitudinal and transverse supports of the supporting frame 11. In this way the oven as a whole, including its base 10, may be free to move relative to the supporting structure due to expansion and contraction from temperature changes, without damage to the oven. The base 10 may be filled between its frame members with suitable material, as for example reinforced concrete, brick or both. The base 10 also may include a burner bracket 14 centrally of each unit. These may be a course of brick 15 above the base 10.

The base 10 advantageously further includes a plurality of courses of brick which may comprise one or more courses of common brick and an upper course of fire brick, laid flat. This portion of the base is built up to form a central bed 16, the bottoms of fire boxes 17, which are separated by a central partition 18, and outer wall 19 so as to provide an insulating air space 20 therebetween. The portions of these courses around the fire boxes 17 and constituting the walls thereof are advantageously of fire brick and are laid on edge.

The several courses of brick above described may be said to constitute as a whole, the base of the oven. With the exception of the fire brick surrounding and constituting the fire boxes 17, and the masonry outer wall 19, all bricks may be laid dry so as to provide for relative movement of the component parts for expansion when the oven is heated.

Above the several courses previously described as constituting the base is the heating flue chamber 21 which advantageously is constructed of fire brick except for the outer walls 19 which may be of common brick masonry. The heating flue chambers cover substantially the area of the oven from fire box 17 to the ends of the sections or unit. The opposite walls of each heating chamber are provided with a plurality of baffles 22 (see Fig. 3) alternately arranged and extending toward but terminating short of the opposite wall so as to provide relatively long circuitous heating flue passages 23 extending from the central portion of each unit to opposite ends thereof. Each circuitous passage 23 communicates at one end with its adjacent fire box 17 and at the other end with an uptake 24 built into the walls of the oven at the ends of the unit.

A cover 25 for the heating flue chamber is advantageously of fire clay tile and constitutes a floor for the baking chamber 26. This floor may be imperforate if desired, except at the uptake flue openings 24 of the heating flue chamber.

The baking chamber 27 is defined by the floor 25, side walls 28 and roof 29, and extends the full length of the section or unit being open at both ends. The side walls 28 advantageously may be of common brick and the roof 29 of fire clay tile, supported upon suitable beams 29ª. One of the side walls is constructed at opposite ends with flue openings communicating with uptake flues 24, which in turn communicate with bridge or cross flues 24ª extending across the baking chamber near the top thereof and at opposite ends of the unit or section.

The bridge or oven cross flues 24ª advantageously may be of hollow rectangular construction (see Figs. 2, 3 and 5) open at one end to communicate with the uptake flue opening 24 of the baking chamber side walls. The cross flues are advantageously constructed of fire clay tile and fire brick supported on suitable beams. The inner side wall of each cross flue is formed with a plurality of openings, as at 24ᵇ, through which products of combustion may be discharged into the baking chamber 27.

A plurality of damper controlled take-off hoods 30 are provided in each oven section and unit, and advantageously these may be arranged in series transversely of the baking chamber (see Fig. 4) so that there may be a continuous uniform withdrawal of baking heat from the baking chamber transversely thereof. In the illustrated embodiment there are two series of take-offs, one for each of the cross flues, and each series comprises three hoods 30 arranged transversely of the baking chamber and connected by ducts 31 to a central offtake 32 connected to a suction fan 33 of desired capacity to produce a high velocity circulation through the baking chamber 27. Each of the hoods may be variably controlled by means of dampers so that the withdrawal of the heated air and products of combustion may be substantially uniform across the oven or otherwise regulated as desired.

The oven may be heated by any suitable fuel, such as oil or gas, oil being preferable. Preferably the burners are of the blast type as distinguished from the jet type for economy. Accordingly we have illustrated a pair of oil burners 35 which may be driven by a common motor 36 for delivering heat to the fire boxes 17. Obviously these burners may be of any approved construction and may be mounted on the bracket 14 in any conventional manner.

The articles to be baked are carried through the oven by means of an endless travelling conveyor 38 trained over a driven roll 39 and an idle roll 40.

According to one feature of the invention, the endless conveyor may be of foraminous construction, as for example, of woven wire material 41 and a suitable tension device 42 may be provided to maintain a desired tension on the conveyor belt. Both the active and return runs of the conveyor may be mounted in the baking chamber 27 to avoid cooling thereof, and the active run of the conveyor belt is supported substantially horizontally, and the return run is supported from the baking chamber floor by means of bars or rolls 43.

A portion of the base, as for example, the portion including the central bed 16, as well as the heating flue chamber 23 and the baking chamber 27 is preferably insulated by a masonry wall 19 spaced therefrom so as to provide a dead air insulating space 20. The entire structure may be further insulated by suitable fibrous insulating material, as for example, mineral wool 44, to conserve the heat. This wool insulation 44 may be laid over the roof 29 to conserve the heat.

Obviously it is desirable to maintain a maximum desired temperature in the baking chamber 27 and to avoid cooling thereof by the entrance of colder room temperature air into the baking chamber at the open ends thereof. This may be accomplished by placing suction nozzles 45 (see Fig. 1) at the open ends of the oven mounted close to the end walls and positioned immediately above the dough conveyor 38. These nozzles may be connected to the suction line 32 by ducts 46 so that the suction therethrough balances the circulation within the entering end of the oven. Any air which may have a tendency to enter the baking chamber 27 at the open end will obviously be drawn off through the suction nozzles before reaching the baking chamber.

In practice the green dough articles to be baked are delivered in any suitable manner to the conveyor 38. The burners 35 having previously been lighted, and adequate oven temperature obtained, the material to be baked is started through the oven. The suction fan 33 establishes a relatively high velocity circulation through the baking chamber which draws products of combustion from the heating flue chambers 23 and uptakes 24. Hence, during operation of the oven there is a continuous flow of products of combustion from the burners circuitously through the whole length of the oven floor, to heat the baking chamber 32 indirectly thereby, and thence there is a continuous discharge of products of combustion from the cross flues 24ª. The temperature of the oven may, in this way, be maintained sufficiently high for satisfactory quick baking, at a minimum fuel expense.

Green dough articles such as crackers and biscuits contain a considerable amount of moisture which is quickly converted into steam as the articles enter the baking chamber. Such articles may advantageously be baked in a dry heat as distinguished from a moist heat which is desirable in the baking of bread and the like. According to the present invention the moist or steam laden heat is quickly withdrawn from the entering end of the making chamber by reason of the high velocity circulation set up through the fan 33 for discharging the moisture laden products of combustion through the first transverse series of take-off hoods, and advantageously two series of take-off hoods 30 (see Fig. 1) may be provided at the entering end of the oven to rapidly take off the steam laden heat. A suitable baffle plate 47 may be provided in the rear of the first row of take-off hoods to prevent the moisture laden heat from travelling through the oven.

As the articles being baked pass the first row of take-off hoods 30, practically all of the moisture has been liberated therefrom, and thereafter the baking heat is dry, permitting the articles to be quickly baked to crisp form. During their traverse of the oven the articles move alternately with and counter to the current of products of combustion in the baking chamber.

The openings around the burners 35 within the fire boxes 17 may advantageously be closed to prevent the entrance of free air. With this arrangement in connection with the means 45 for preventing the entrance of air at the ends of the baking chamber 27, the baking heat is composed entirely of products of combustion. This has been found to produce highly desirable baked articles, particularly when baked on a woven wire conveyor.

It will be noted that the products of combustion are discharged into the fire boxes 17 which extend the whole width of the oven floor. Thereafter these products of combustion travel through the circuitous heating flue passages 23 across the full width and throughout the full length of the oven floor to heat the floor uniformly, and are then discharged uniformly across the width of the baking chamber. After travelling the length of the baking chamber the products of combustion are withdrawn uniform across the width thereof, so that the entire distribution of heat is uniform throughout the oven. In this way hot and cold spots transversely of the oven are avoided, insuring a more uniform baking of articles placed transversely of the conveyor, which has been an objectionable feature heretofore with travelling ovens.

The method and apparatus herein disclosed have been found in practice to be particularly useful for baking biscuits, crackers and the like which should be baked crisp at high speed and at minimum fuel expense. The use of a woven wire conveyor is highly advantageous for baking certain articles, as it permits of moving the dough articles through a uniform baking heat and thus subjecting the articles uniformly to such heat. This avoids the necessity of damper controlled ducts between the heating chamber and baking chamber for adjusting the top and bottom heats as has been the case when solid or imperforate conveyor elements are used.

Numerous other advantages of the invention will be apparent to those skilled in the art.

It is to be understood that the invention is not restricted to the details shown and described which constitute but one embodiment of the invention.

We claim:

1. A horizontally travelling baker's oven composed of a plurality of like units of sections, each comprising an elongated horizontally disposed baking oven having a ceramic tile floor, a horizontally travelling reticulated conveyor movable through the baking chamber for conveying articles to be baked therethrough, a fluent fuel burner for each unit disposed below the floor and substantially centrally of the unit, circuitous heating flue passages extending from said burner toward opposite ends of said sections and in contact with the oven floor, means connecting the end portions of said flue passages with the baking chamber at opposite ends of the oven section for discharging products of combustion therein, offtake hoods intermediate said last named connecting means, means for confining the products of combustion from each fuel burner to that portion of the baking chamber directly above its associated heating flue chamber and means for establishing a forced draft circulation from said burners through said heating flues, baking chamber and offtake hoods.

2. A horizontally travelling baker's oven composed of a plurality of like units or sections, each comprising an elongated horizontally disposed baking oven having a ceramic tile floor, a horizontally travelling conveyor movable through the baking chamber for conveying articles to be baked therethrough, a pair of fluent fuel blast burners for each unit disposed substantially centrally of each unit, circuitous heating flue passages underlying substantially the entire area of the baking chamber floor and extending from said burners toward opposite ends of said section for heating the oven floor uniformly, uptake passages at opposite ends of the oven section connecting the end portions of said heating flue passages with the baking chamber and discharging products of combustion therein, offtake hoods in the baking chamber roof, intermediate the uptake passages, and suction means connected with the offtake hoods for establishing a forced draft circulation from the burners through the circuitous heating flue passages and in opposite directions through the baking chamber.

3. A horizontally travelling baker's oven composed of a plurality of like units or sections, each comprising an elongated horizontally disposed baking oven having a ceramic tile floor, an endless horizontally travelling woven wire conveyor having its active and return runs movable in said baking chamber for conveying articles to be baked therethrough with all sides of the articles exposed to a baking atmosphere, a pair of fluent fuel blast burners for each unit disposed substantially centrally of each unit, circuitous heating flue passages underlying substantially the entire area of the baking chamber floor and extending from said burners toward opposite ends of said section for heating the oven floor uniformly, uptake passages at opposite ends of the oven section connecting the end portions of said heating flue passages with the baking chamber and discharging products of combustion therein, offtake hoods in the baking chamber roof, intermediate the uptake passages, and suction means connected with the offtake hoods for establishing a forced draft circulation from the burners through the circuitous heating flue passages and in opposite directions through the baking chamber.

4. A horizontally travelling baker's oven composed of a plurality of like units or sections, each comprising an elongated horizontally disposed baking oven having a ceramic tile floor, a horizontally travelling conveyor movable through the baking chamber for conveying articles to be baked therethrough, a pair of fluent fuel blast burners for each unit disposed substantially centrally of each unit, circuitous heating flue passages underlying substantially the entire area of the baking chamber floor and extending from said burners toward opposite ends of said section for heating the oven floor uniformly, uptake passages at opposite ends of the oven section connecting the end portions of said heating flue passages with the baking chamber and discharging products of combustion therein, offtake hoods in the baking chamber roof, intermediate the uptake passages, and suction means connected with the offtake hoods for establishing a forced draft circulation from the burners through the circuitous heating flue passages and in opposite directions through the baking chamber, and a baffle between the offtake hoods for the opposite ends of each section.

5. A horizontally travelling baker's oven composed of a plurality of like units or sections, each comprising an elongated horizontally disposed baking oven having a ceramic tile floor, an endless horizontally travelling woven wire conveyor having its active and return runs movable in said baking chamber for conveying articles to be baked therethrough, a pair of fluent fuel blast burners for each unit disposed substantially centrally of each unit, circuitous heating flue passages underlying substantially the entire area of the baking chamber floor and extending from said burners toward opposite ends of said section for heating the oven floor uniformly, uptake passages at opposite ends of the oven section connecting the end portions of said heating flue passages with the baking chamber and discharging products of combustion therein, offtake hoods in the baking chamber roof, intermediate the uptake passages, and suction means connected with the offtake hoods for establishing a forced draft circulation from the burners through the circuitous heating flue passages and in opposite directions through the baking chamber, and an insulated masonry wall spaced from said heating flue passages and baking chamber.

6. A horizontally travelling baker's oven composed of a plurality of like units or sections, each comprising an elongated horizontally disposed baking oven having a ceramic tile floor, an endless horizontally travelling woven wire conveyor having its active and return runs movable in said baking chamber for conveying articles to be baked therethrough, a pair of fluent fuel blast burners for each unit disposed substantially centrally of each unit, circuitous heating flue passages underlying substantially the entire area of the baking chamber floor and extending from said burners toward opposite ends of said section for heating the oven floor uniformly, uptake passages at opposite ends of the oven section connecting the end portions of said heating flue passages with the baking chamber and discharging products of combustion therein, offtake hoods in the baking chamber roof, intermediate the uptake passages, suction means connected with the offtake hoods for establishing a forced draft circulation from the burners through the circuitous heating flue passages and in opposite directions through the baking chamber, and a base for said oven section comprising a plurality of courses of brickwork laid dry to allow for expansion and contraction of said base without liability of cracking said baking chamber and heating flue passages.

7. A travelling baker's oven comprising a base composed of longitudinal and transverse beam members, a reinforced concrete filling between said beam members, a support for said base including a structural framework having longitudinal and transverse beam members on which said beam members of said base are loosely supported, circuitous heating flue passages supported on said base and extending over the entire horizontal area thereof, an elongated horizontally disposed baking chamber having its floor directly contacting said heating flue passages, a plurality of fluent fuel burners for supplying heat to said heating flue passages, and means for maintaining a forced draft circulation from said burners through said heating flue passages and baking chamber.

8. A travelling baker's oven comprising a base composed of longitudinal and transverse beam members, a reinforced concrete filling between said beam members, a support for said base including a structural framework having longitudinal and transverse beam members on which said beam members of said base are loosely supported, circuitous heating flue passages supported on said base and extending over the entire horizontal area thereof, an elongated horizontally disposed baking chamber having its floor directly contacting said heating flue passages, a plurality of fluent fuel burners for supplying heat to said heating flue passages, and an insulated masonry wall spaced from and insulating said baking chamber, flue passages and a portion of the base.

9. A travelling baker's oven comprising a base having fire boxes intermediate the ends thereof, a fluent fuel blast burner for each of the fire boxes, a heating flue chamber mounted on said base and including elongated circuitous flue passages connected at one end to the fire boxes and extending therefrom in opposite directions towards the ends of the oven, an oven floor directly overlying the heating flue chamber and heated thereby, a baking chamber above the oven floor, means connected to the ends of the heating flue chamber remote from the fire boxes for discharging products of combustion into the baking chamber to establish a uniform baking heat throughout the length thereof, means for confining the products of combustion from each fuel burner to that portion of the baking chamber directly above its associated heating flue chamber and an endless conveyor having its active and return runs mounted in the baking chamber for conveying articles to be baked through the oven.

10. A travelling baker's oven comprising a base having fire boxes intermediate the ends thereof, a fluent fuel blast burner for each of the fire boxes, a heating flue chamber mounted on said base and including elongated circuitous flue passages connected at one end to the fire boxes and extending therefrom in opposite directions towards the ends of the oven, an oven floor directly overlying the heating flue chamber and heated thereby, a baking chamber above the oven floor, means connected to the ends of the heating flue chamber remote from the fire boxes for discharging products of combustion into the baking chamber to establish a uniform baking heat throughout the length thereof, means for preventing the products of combustion supplied to the entering end of the baking chamber from traversing through the oven past an initial heating section in which moisture in the green dough articles is expelled therefrom by the heat in the baking chamber and an endless woven wire conveyor having its active and return runs mounted in the baking chamber for conveying articles to be baked through the oven.

11. A travelling baker's oven comprising a base having fire boxes intermediate the ends thereof, a fluent fuel blast burner for each of the fire boxes, a heating flue chamber mounted on said base and including elongated circuitous flue passages connected at one end to the fire boxes and extending therefrom in opposite directions toward the ends of the oven, an oven floor directly overlying the heating flue chamber and heated thereby, a baking chamber above the oven floor, means connected to the ends of the heating flue chamber remote from the fire boxes for discharging products of combustion into the baking chamber to establish a uniform baking heat throughout the length thereof, an endless woven wire conveyor having its active and return runs mounted in the baking chamber for conveying articles to be baked through the oven, and means for establishing a forced draft circulation from said fire boxes through said flue passages and baking chamber.

12. A travelling baker's oven comprising an elongated horizontally disposed baking chamber, an endless horizontal traveling woven wire conveyor for moving articles to be baked through said baking chamber, a horizontally disposed heating chamber having circuitous heating flue passages under the entire area and length of the baking chamber, a burner for supplying heat to the heating chamber substantially centrally of the length thereof, means for discharging products of combustion from the ends of said heating chamber into the baking chamber uniformly across the width thereof, and means for withdrawing products of combustion from the baking chamber substantially centrally between the discharging means and uniformly across the width thereof to provide a uniform baking heat transversely of the baking chamber.

13. A horizontally travelling baker's oven comprising an elongated horizontally disposed baking chamber, means for heating said chamber comprising a plurality of pairs of discharge flues for delivering products of combustion to said chamber at points spaced throughout the length thereof, the flues of each pair being oppositely disposed for discharging products of combustion toward each other, an off-take connected to said oven chamber intermediate each pair of discharge flues, heating chambers disposed below said baking chamber and including a source of heat substantially centrally arranged between said discharge flues, circuitous heating flue passages extending from said source of heat in opposite directions for heating the floor of the oven chamber intermediate said discharge flues, uptake passages connecting the opposite ends of the heating flue passages with the discharge flues thereabove, and an endless horizontally travelling conveyor for moving the articles to be baked through said baking chamber.

14. A horizontally travelling baker's oven comprising an elongated horizontally disposed baking chamber, means for heating said chamber comprising a plurality of pairs of discharge flues for delivering products of combustion to said chamber at points spaced throughout the length thereof, the flues of each pair being oppositely disposed for discharging products of combustion toward each other, an off-take connected to said oven chamber intermediate each pair of discharge flues, a pair of fluent fuel burners arranged substantially midway between the discharge flues and immediately below said baking chamber, circuitous heating flue passages extending from said burners in opposite directions for heating the floor of the oven chamber intermediate said discharge flues, uptake passages connecting the ends of the heating flue passages with the discharge flues thereabove, and an endless reticulated travelling conveyor for moving the articles to be baked through said baking chamber.

15. A horizontally travelling baker's oven comprising an elongated horizontally disposed baking chamber, means for heating said chamber comprising a plurality of pairs of discharge flues for delivering products of combustion to said chamber at points spaced throughout the length thereof, the flues of each pair being oppositely disposed for discharging products of combustion toward each other, an off-take connected to said oven chamber intermediate each pair of discharge flues, heating chambers disposed below said baking chamber and including a source of heat substantially centrally arranged between said discharge flues, circuitous heating flue passages extending from said source of heat in opposite directions for heating the floor of the oven chamber intermediate said discharge flues, uptake passages connecting the opposite ends of the heating flue passages with the discharge flues thereabove, means for continuously removing from the entering end of said baking chamber steam liberated by the green dough articles fed thereto, and an endless horizontally travelling conveyor for moving the articles to be baked through said baking chamber.

16. A horizontally travelling baker's oven comprising an elongated horizontally disposed baking chamber, means for heating said chamber comprising a plurality of pairs of discharge flues for delivering products of combustion to said chamber at points spaced throughout the length thereof, the flues of each pair being oppositely disposed for discharging products of combustion toward each other, an off-take connected to said oven chamber intermediate each pair of discharge flues, heating chambers disposed below said baking chamber and including a source of heat substantially centrally arranged between said discharge flues, circuitous heating flue passages extending from said source of heat in opposite directions for heating the floor of the oven chamber intermediate said discharge flues, uptake passages connecting the opposite ends of the heating flue passages with the discharge flues thereabove, means for continuously removing from the entering end of the oven steam liberated by the green dough articles fed thereto and for substantially preventing the entrance of air to the baking chamber through the opposite open ends thereto to provide a relatively dry baking heat of products of combustion only, and an endless horizontally travelling conveyor for moving the articles to be baked through said chamber.

PAUL R. HOLTZMAN.
ALLEN B. HOLTZMAN.